(12) United States Patent
Wang et al.

(10) Patent No.: US 8,331,310 B2
(45) Date of Patent: Dec. 11, 2012

(54) SYSTEMS AND METHODS EMPLOYING MULTIPLE INPUT MULTIPLE OUTPUT (MIMO) TECHNIQUES

(75) Inventors: Jibing Wang, San Diego, CA (US); Rashid Ahmed Akbar Attar, San Diego, CA (US); Tamer Kadous, San Diego, CA (US); Jing Sun, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 559 days.

(21) Appl. No.: 12/545,693

(22) Filed: Aug. 21, 2009

(65) Prior Publication Data

US 2010/0067480 A1 Mar. 18, 2010

Related U.S. Application Data

(60) Provisional application No. 61/091,306, filed on Aug. 22, 2008.

(51) Int. Cl.
*H04W 4/00* (2009.01)
(52) U.S. Cl. .................................. 370/330; 370/334
(58) Field of Classification Search .................. None
See application file for complete search history.

(56) References Cited

U.S. PATENT DOCUMENTS

| | | | |
|---|---|---|---|
| 2004/0071110 A1* | 4/2004 | Guey et al. | 370/329 |
| 2005/0265236 A1* | 12/2005 | Kwon et al. | 370/235 |
| 2006/0229091 A1* | 10/2006 | Rezaiifar et al. | 455/509 |
| 2007/0116095 A1* | 5/2007 | Gerlach | 375/130 |
| 2007/0195688 A1 | 8/2007 | Bhushan et al. | |
| 2007/0195690 A1* | 8/2007 | Bhushan et al. | 370/208 |
| 2007/0206698 A1* | 9/2007 | Yu et al. | 375/267 |
| 2007/0242770 A1* | 10/2007 | Kim et al. | 375/267 |
| 2007/0297529 A1* | 12/2007 | Zhou et al. | 375/267 |
| 2008/0316099 A1* | 12/2008 | Fujii | 342/373 |
| 2009/0092091 A1* | 4/2009 | Balasubramanian | 370/329 |
| 2009/0147668 A1* | 6/2009 | Manakkal et al. | 370/208 |
| 2009/0252104 A1* | 10/2009 | Zhang et al. | 370/329 |

OTHER PUBLICATIONS

International Search Report and Written Opinion—PCT/US2009/054702—ISA/EPO—Feb. 24, 2010.

* cited by examiner

*Primary Examiner* — Jianye Wu
(74) *Attorney, Agent, or Firm* — Charles Chesney

(57) ABSTRACT

A system has multiple antennas, a Time Division Multiplexing (TDM) module creating TDM slots, and demultiplexing circuitry inserting within the TDM slots Orthogonal Frequency Division Multiplexing (OFDM) symbols and associating the TDM slots with data sub-streams. The system also includes precoding circuitry associating the data sub-streams with multiple tones. Each of the respective tones corresponds to a respective one of the antennas. The antennas transmit the data sub-streams using the multiple tones.

29 Claims, 12 Drawing Sheets

3-LAYER MIMO-OFDM TRANSMISSION

4-LAYER MIMO-OFDM TRANSMISSION

SYSTEMS AND METHODS EMPLOYING MULTIPLE INPUT MULTIPLE OUTPUT (MIMO) TECHNIQUES

CLAIM OF PRIORITY UNDER 35 U.S.C. §119

The present application for patent claims priority to Provisional Application No. 61/091,306 entitled "EV-DO FL MIMO" filed Aug. 22, 2008, and assigned to the assignee hereof and hereby expressly incorporated by reference herein.

BACKGROUND

1. Field

The present disclosure relates generally to techniques using Multiple Input Multiple Output (MIMO) antenna schemes and, more specifically, to techniques employing MIMO and Orthogonal Frequency Division Multiplexing (OFDM) to transmit data.

2. Background

Currently, there is interest in multiple-antenna systems, such as Multiple Input Multiple Output (MIMO) systems, where two or more devices communicate with each other, each using more than one antenna, in order to enhance data transmission. Some multiple-antenna systems increase throughput and/or quality by exploiting spatial multiplexing and/or antenna diversity to send the same data on separate signals or to create a phased array to send data.

Evolution Data Optimized (EVDO) is a telecommunications standard promulgated by the $3^{rd}$ Generation Partnership Project 2 as part of the CDMA2000 family. EVDO facilitates high data rates in wireless networks. EVDO has gone through several evolutions, the current revision of which provides for a forward link using Time Division Multiple Access (TDMA) principles to transmit data sub-streams on multiple carriers (tones). Current revisions of EVDO, however, do not take advantage of MIMO capabilities, which may be available in some mobile devices. It would be desirable to provide users having MIMO capabilities with the opportunity to use such capabilities in an EVDO network, while also supporting users who lack MIMO capability, i.e., having backward compatibility.

Orthogonal Frequency Division Multiplexing (OFDM) is a technology that transmits data on multiple, orthogonal sub-carriers, each of the sub-carriers corresponding to a parallel data stream. OFDM has found use in conventional data systems, such as Enhanced Broadcast and Multicast Services (Enhanced BCMCS). However, while Enhanced BCMCS provides for multi-cast and broadcast functionality, EVDO provides for unicast functionality. Moreover, the Enhanced BCMCS incorporating OFDM do not support MIMO. Currently, there is no unicast system available that incorporates the advantages of OFDM and MIMO into a TDMA forward link, while remaining backward compatible with earlier revisions.

SUMMARY

According to one embodiment, a system supports forward link multi input multi output (MIMO) communications. The system includes antennas and a Time Division Multiplexing (TDM) module creating TDM slots. The system also includes demultiplexing circuitry inserting within the TDM slots multiple Orthogonal Frequency Division Multiplexing (OFDM) symbols, and associating the TDM slots with data sub-streams. Precoding circuitry associates the data sub-streams with tones. Each of the respective tones corresponds to a respective one of the antennas. The antennas transmit the data sub-streams using the tones.

In another embodiment, a method supports forward link multi input multi output (MIMO) communications. The method includes generating Time Division Multiplexing (TDM) slots, and associating the TDM slots with data sub-streams. The method also includes inserting Orthogonal Frequency Division Multiplexing (OFDM) symbols into the TDM slots, and processing the TDM slots with the OFDM symbols using a precoding matrix, thereby associating the data sub-streams with multiple tones. Each of the tones corresponds to an antenna. The data sub-streams are transmitted to a remote unit using the tones and antennas.

In yet another embodiment, a system supports forward link multi input multi output (MIMO) communications. The system includes antennas, means for creating TDM slots, and means for inserting within the TDM slots multiple Orthogonal Frequency Division Multiplexing (OFDM) symbols and associating the TDM slots with data sub-streams. The system also includes means for associating the data sub-streams with multiple tones. Each of the respective tones corresponds to a respective one of the antennas. The antennas transmit the data sub-streams using the tones.

In still another embodiment, a computer program product supports forward link multi input multi output (MIMO) communications. The product is tangibly embodied on a computer readable medium having computer program logic recorded thereon. The computer program product includes code that generates Time Division Multiplexing (TDM) slots. It also includes code that associates the TDM slots with data sub-streams. The program product further includes code that inserts Orthogonal Frequency Division Multiplexing (OFDM) symbols into the TDM slots, and code that processes the TDM slots with the OFDM symbols using a precoding matrix, thereby associating the data sub-streams with multiple tones. Each of the tones corresponds to a respective one of multiple antennas.

In another embodiment, a system supports forward link multi input multi output (MIMO) communications. The system includes antennas receiving data sub-streams on multiple tones. Each of the data sub-streams includes Time Division Multiplexing (TDM) slots with Orthogonal Frequency Division Multiplexing (OFDM) symbols therein. The data sub-streams also include first pilots possibly overlapping with data in data transmissions, and second pilots embedded within the OFDM symbols. The system further includes circuitry multiplexing the data sub-streams and decoding the data in the data sub-streams, as well as circuitry using the first pilots and the second pilots. The first pilots are used to derive precoding information, spatial multiplexing order information and data rate information. The second pilots are used to detect preambles of packets of the data sub-streams and to demodulate and to decode the data sub-streams. The system also has circuitry feeding back the precoding information, spatial multiplexing order information, and data rate information to a base station.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the technology of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

Figure 1:
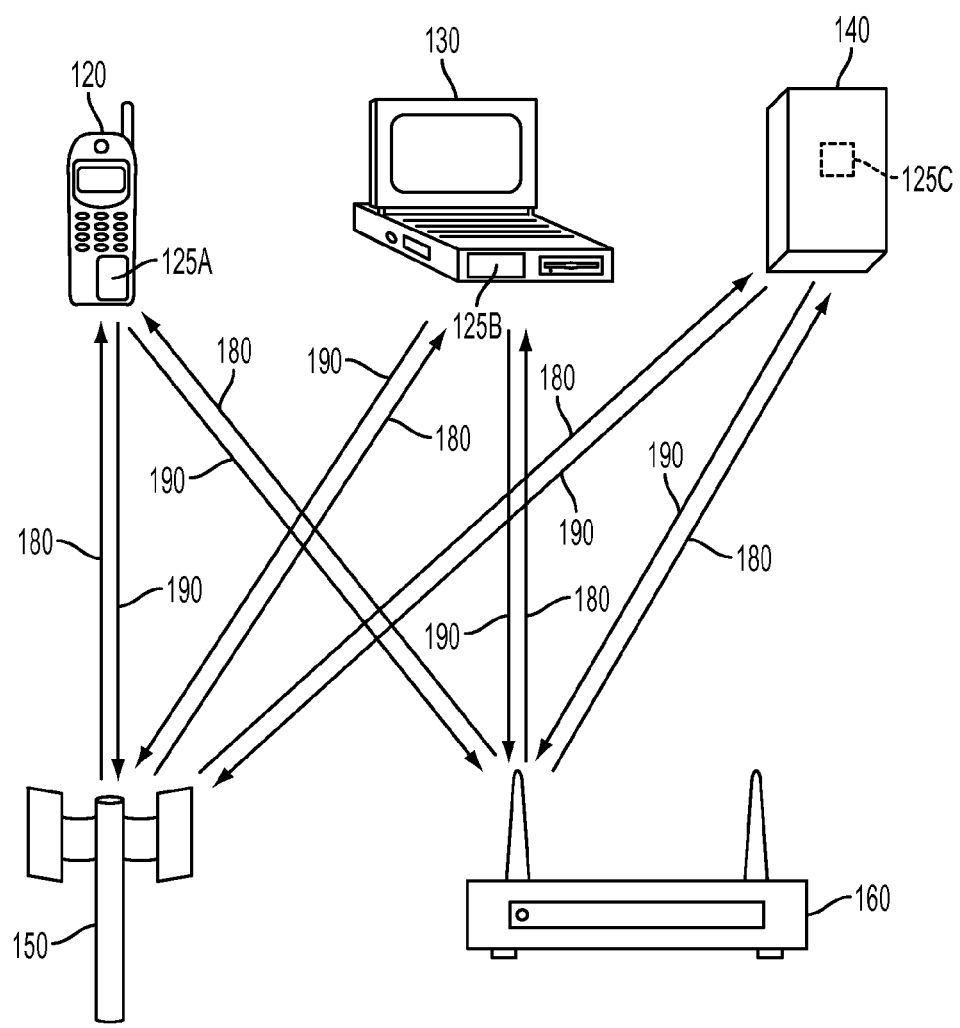
FIG. 1 shows an exemplary wireless communication system in which an embodiment of the disclosure may be advantageously employed.

FIG. 1 shows an exemplary wireless communication system 100 in which an embodiment of the disclosure may be advantageously employed. For purposes of illustration, FIG. 1 shows three remote units 120, 130, and 140 and two base stations 150, 160. It will be recognized that wireless communication systems may have many more remote units and base stations. The remote units 120, 130, and 140 include processor devices 125A, 125B, and 125C, respectively, which in various embodiments provide functionality for incorporating multiple input multiple output (MIMO) techniques into wireless broadband technology, such as Evolution Data optimized (EVDO), as discussed further below. The functionality described in more detail below can be implemented using executable code stored to a computer-readable medium integral to, or separate from, the processor devices 125A, 125B, and 125C. FIG. 1 shows the forward link signals 180 from the base stations 150, 160 and the remote units 120, 130, and 140 and the reverse link signals 190 from the remote units 120, 130, and 140 to base stations 150, 160.

In FIG. 1, the remote unit 120 is shown as a mobile telephone, the remote unit 130 is shown as a portable computer, and the remote unit 140 is shown as a computer in a wireless local loop system. For example, the remote units may include mobile devices, such as cell phones, hand-held personal communication systems (PCS) units, portable data units such as personal data assistants; the remote units may also include fixed location data units such as meter reading equipment. Although FIG. 1 illustrates remote units according to the teachings of the disclosure, the disclosure is not limited to these exemplary illustrated units. The disclosure may be suitably employed in any device which includes multiple antennas.

Furthermore, the examples below specifically refer to base stations and remote units in an EVDO network, but the scope of embodiments is not so limited. For instance, many of the features described below are adaptable for use in systems other than EVDO systems, such as systems using Universal Mobile Telecommunications System (UMTS), Global System for Mobile Communications/Enhanced Data Rates for GSM Evolution (GSM/EDGE), and the like.

Figure 2:
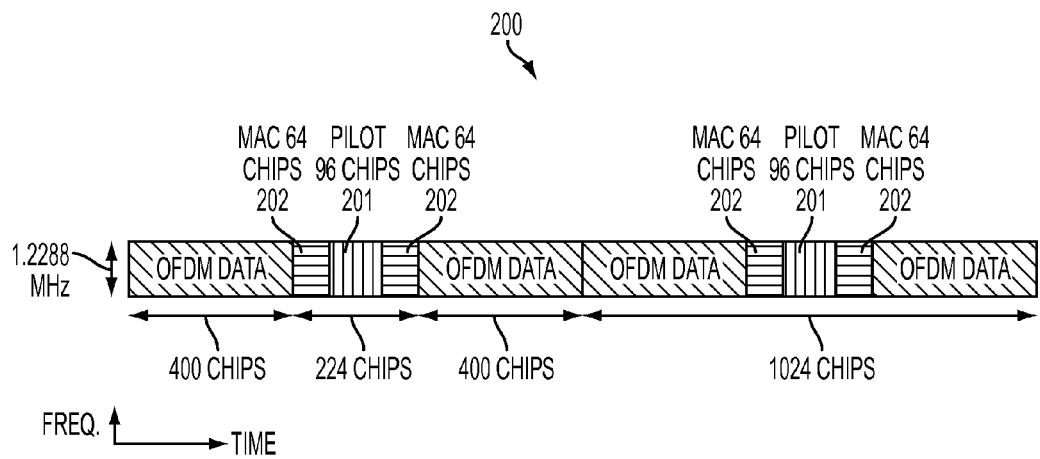
FIG. 2 is an illustration of an exemplary forward link slot, adapted according to one embodiment.

FIG. 2 is an illustration of an exemplary forward link slot 200, adapted according to one embodiment. The forward link slot 200 is a Time Division Multiplexing (TDM) slot with OFDM data inserted therein. In this example, the OFDM data is transmitted over 1600 chips (where each chip is slightly shorter than one microsecond), and the pilot segments 201 and the Media Access Control (MAC) segments 202 are preserved for backward compatibility with systems that use EVDO Rev. 0, A or B.

Embodiments of the disclosure can use any of a variety of particular characteristics, such as sample rates, guard times, Cyclic Prefix (CP) lengths, and the like. Characteristic may be chosen for any of a variety of reasons, such as for high mobility and long delay spread. Exemplary numerology of the forward link slot 200 are shown in Table 1, and it is understood that the scope of embodiments is not limited to the particular example shown in Table 1.

TABLE 1

| Parameter | Value |
|---|---|
| Sample rate | 1.2288 Msps |
| Number of sub-carriers per OFDM symbol | 180 |
| Sub-carrier spacing | 6.8 KHz |
| FFT Duration | 180 chips (≈146.5 μs) |
| Cyclic prefix length | 16 chips (≈13 μs) |
| Guard time (Windowing) | 4 chips (≈3.255 μs) |
| OFDM symbol duration | 200 chips (≈162.76 μs) |

In this example, the same sampling rate of 1.2288 Msps is maintained so as to be compatible with EVDO Rev. A and B. The number of tones in an OFDM symbol is chosen to be 180. After adding the CP and windowing. the total OFDM symbol duration is 200 chips, and the slot 200 includes eight OFDM symbols.

Among the 180 tones of each OFDM symbol, some tones are reserved for dedicated spatial pilots (DSP). DSPs are used for channel and interference estimation for demodulation purposes. Moreover, DSPs are also used for OFDM preamble detection, since DSPs can be created by scrambling the modulation symbols sent on DSPs with the desired user MAC identification. DSPs are inserted into the OFDM symbols and, therefore, experience the same channel seen by data, thereby capturing the same beamforming gains and experiencing the same detrimental phenomena.

Another set of pilots, referred to herein as common spatial pilots (CSP), are transmitted on some slots at each antenna and are used for channel quality estimation. The CSPs overlap with some data, as will be described further below.

Figure 3:
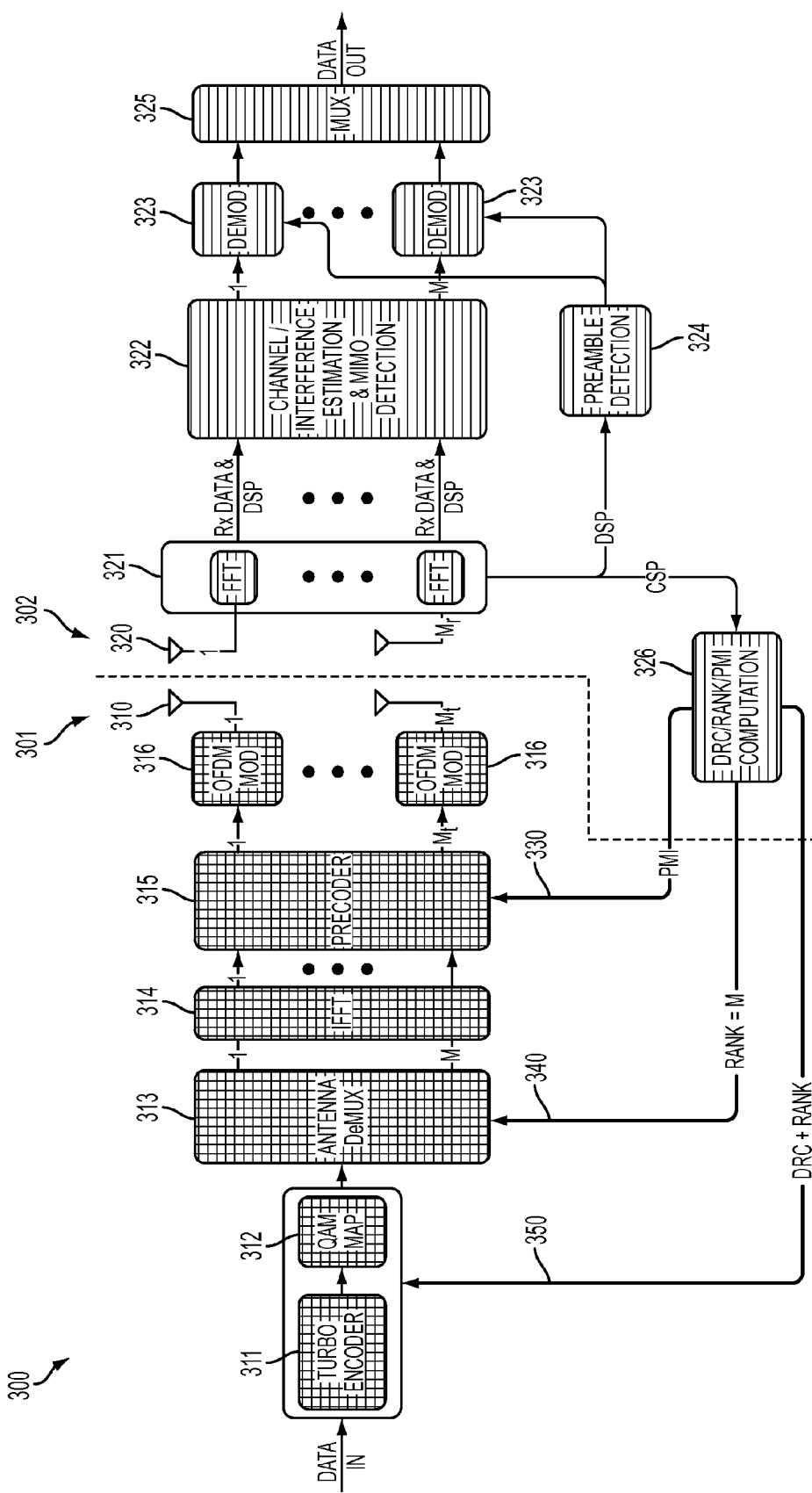
FIG. 3 is an illustration of an exemplary system adapted according to one embodiment.

FIG. 3 is an illustration of an exemplary system 300 adapted according to one embodiment of the disclosure. The system 300 includes the base station 301 and the remote unit 302. The base station 301 includes $M_t$ antennas 310, and the remote unit 302 includes $M_r$ antennas 320, thereby facilitating communication using MIMO techniques. $M_r$ and $M_t$ are integers equal to or larger than one and may or may not be equal to each other.

The base station 301 receives the data and processes it through a turbo encoder 311 and a Quadrature Amplitude Modulation (QAM) map 312. The encoded and modulated data, which is in the form of TDM slots, is then fed to the antenna demultiplexer 313, which associates the TDM slots with multiple data sub-streams M, where M is an integer larger than or equal to one. The data sub-streams are also refereed to herein as virtual antennas. The data sub-streams are then delivered to the Inverse Fast Fourier Transform (IFFT) module 314 and to the precoder module 315. The precoder module 315 associates the M data sub-streams with $M_t$ tones to create $M_t$ channels, where $M_t$ may or may not be equal to M. The precoder module 315 also multiplies the data sub-streams by a precoding matrix of steering vectors selected from the codebook. The $M_t$ complex output precoded sub-streams are then fed to an OFDM modulator and transmitted on one of the antenna elements 310. The OFDM modulation modules 316 add OFDM-specific characteristics, such as CPs and windowing, to the data sub-streams on the respective channels. Physical antennas 310 transmit the data.

Figure 4:
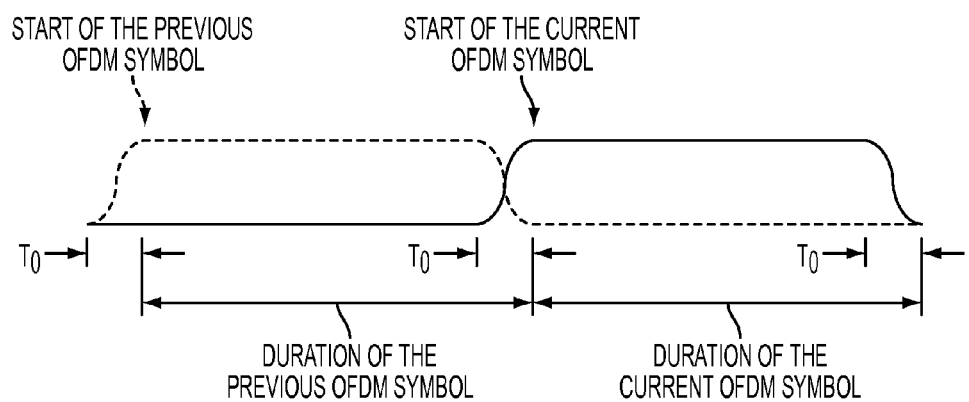
FIG. 4 is an illustration of an overlap and add combining two OFDM symbols, according to one embodiment.

In this example, the sequences of $N_{FFT}=180$ complex modulation symbols per OFDM symbol are converted to a time domain complex baseband waveform using an inverse Fast Fourier Transform (IFFT) operation at antenna demultiplexor module 313. After precoding, the OFDM modulation modules 316 add a cyclic prefix of length $N_{cp}=16$ chips to time samples to combat inter symbol interference (ISI) due to multipath channel fading. A windowing operation is then applied on the $N_{FFT}+N_{cp}$ samples to improve the spectral properties of the OFDM signal, e.g., for better spectral decay. The windowing function is chosen to be a raised cosine. As shown in FIG. 4, two consecutive OFDM symbols are combined through an overlap and add process over the guard time duration, $T_G$, which amounts to four chips.

On the remote unit side, the data sub-streams are received by the physical antennas 320 and sent to Fast Fourier Transform (FFT) circuitry 321, which detects the CSPs and DSPs. The received data and the DSPs are fed to the channel interference estimation and MIMO detection unit 322, which detects the channel state using the DSPs and extracts soft symbols for the M transmitted data sub-streams. The DSPs are also fed to the preamble detection module, which uses the DSPs to detect the packet preambles and feeds the preamble information to the demodulators 323 (the packet format is identified through preamble detection). The data is then sent to the multiplexer 325 that performs channel de-interleaving and Turbo decoding. The data output can then be further processed and presented in a human-perceptible form, such as voice over a speaker or video on a screen.

The MIMO transmission is based on single codeword (SCW) approach where the same codeword is transmitted over all spatial dimensions. The example design of the system 300 presents a closed loop form of SCW where a codebook (of beamforming vectors) is defined that quantizes the spatial dimension. The remote unit 302 includes Data Rate Channel (DRC)/Rank/Precoding Matrix Index (PMI) computation module 326, which uses the CSPs to derive various information. The DRC information includes an indication of the data rate that the remote unit 302 can handle at an acceptable frame error rate. The remote unit 302 also feeds back the corresponding MIMO rank, M, defined to be the number of modulation symbols transmitted simultaneously (i.e. the Spatial Multiplexing order) that can be handled by the base station 301. The base station 301 chooses the packet format based on the DRC information and the rank.

Additionally, the remote unit 302 uses the CSPs to determine which of the matrices of steering vectors should be used in the next transmission. For example, the remote unit uses the CSPs to determine which of the available precoding matrices is the closest to the estimated right Eigen matrix of the current channel realization, and the remote unit 302 passes the index of the selected matrix (i.e., PMI) to the base station 301.

Figure 5:
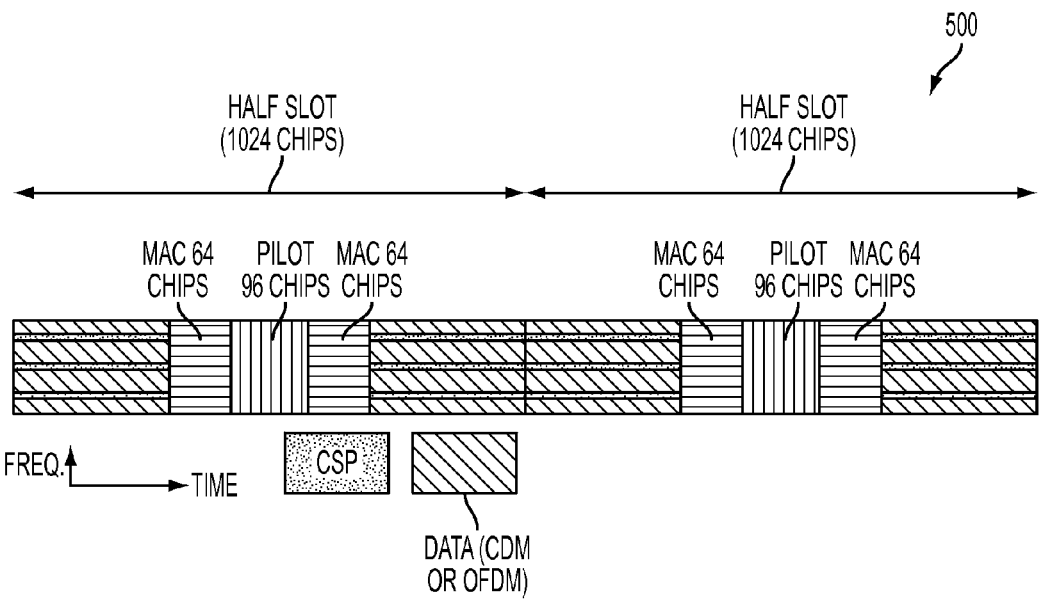
FIG. 5 is an illustration of an exemplary CSP slot, adapted according to one embodiment.

As mentioned above, the example system of FIG. 3 includes two sets of pilots—CSPs and DSPs. FIG. 5 is an illustration of an exemplary CSP slot 500, adapted according to one embodiment. The CSPs are transmitted directly on the physical antenna elements without beamforming. In one embodiment, the set of CSPs is divided into a number of sub-sets, each sub-set pertaining to one of the potential data sub-streams. That is, if the maximum number of simultaneous sub-streams in a MIMO transmission (i.e., the maximum possible value for M) is denoted by $N_{layers,max}$, the CSP is divided into $N_{layers,max}$ subsets of pilots, where each sub-set of pilots contains $N_{csp}$ pilots, and where $N_{csp}$ is a sector-wide parameter that is configurable.

The CSPs are sent on some slots (nominally every 4 slots, but some embodiments differ) referred to herein as CSP-slots. On a CSP-slot, CSPs are transmitted on equally spaced tones in the data portion, as shown in FIG. 5. Consequently, if the data is Code Division Multiplexing (CDM) rather than OFDM, CSPs present a noise floor decreasing the maximum attainable Signal to Interference Ratio (SINR) on a CSP-slot. It should be noted that some embodiments use CDM for some slots, as well. If the data is OFDM, the CSPs present a noise floor only on the tones shared with data. On the other hand, the CSPs experience interference from data, but also potentially experience high processing gain.

Figure 6:
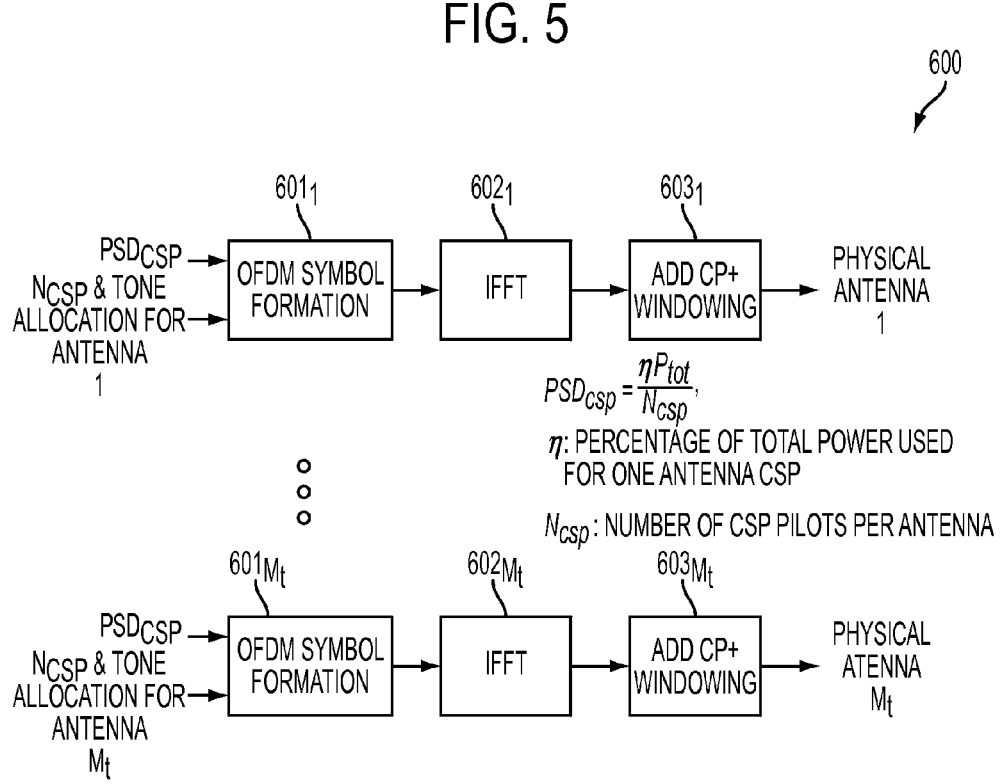
FIG. 6 is an illustration of exemplary system, adapted according to embodiments for generating CSPs.
Figure 7A:
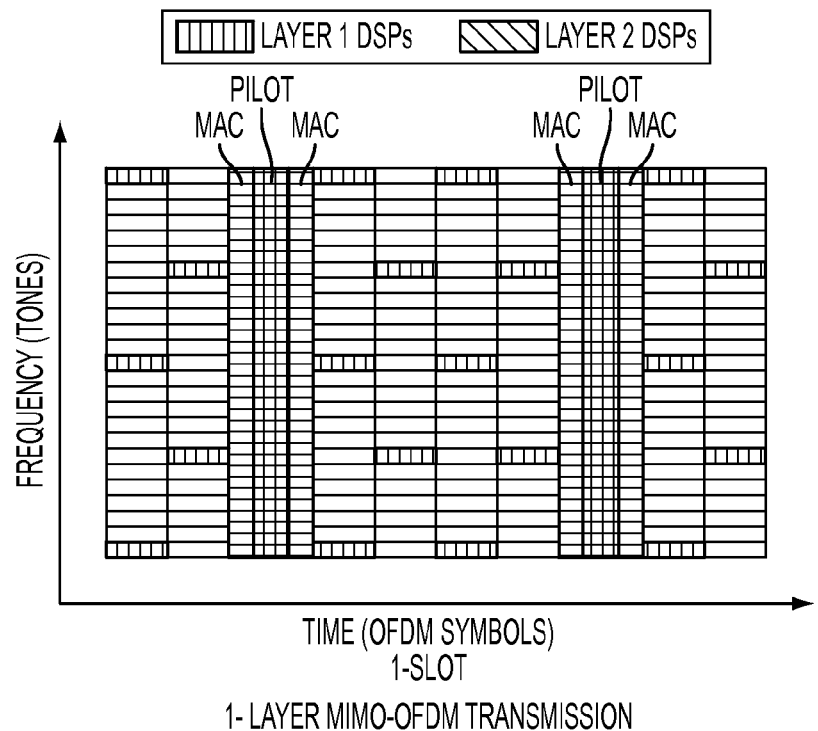
FIGS. 7A-D is an illustration of DSP patterns for different values of M according to one embodiment.
Figure 7B:
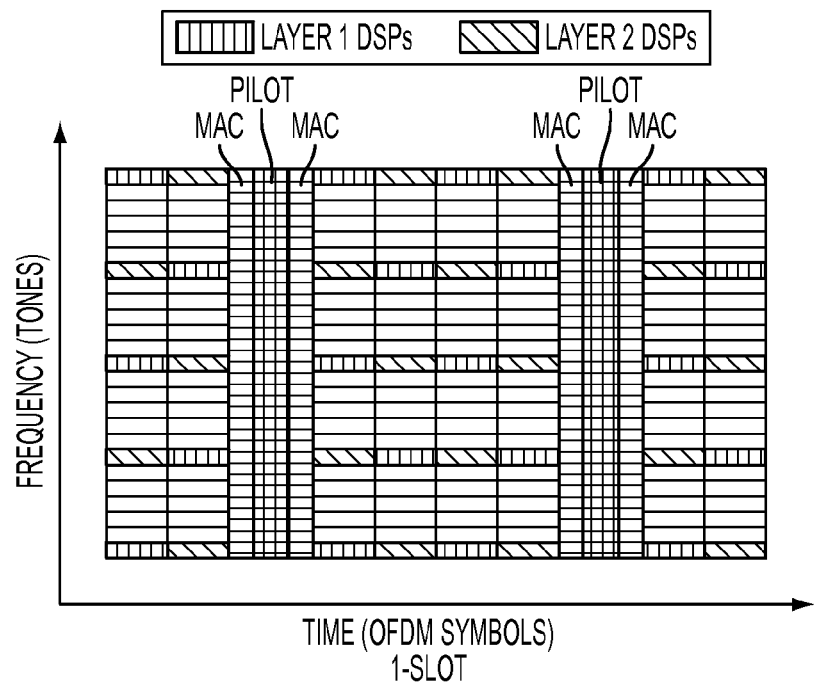
Figure 7C:
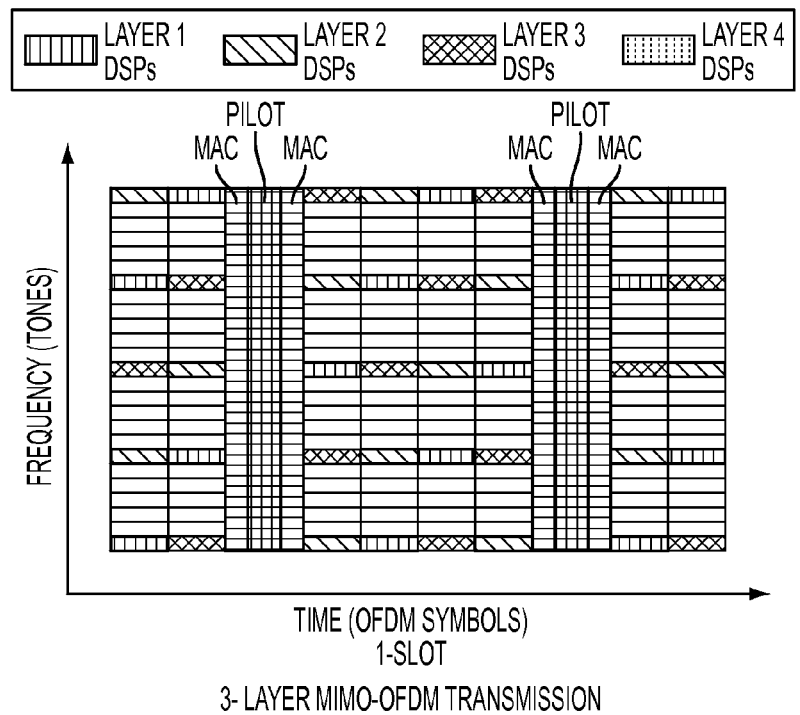
Figure 7D:
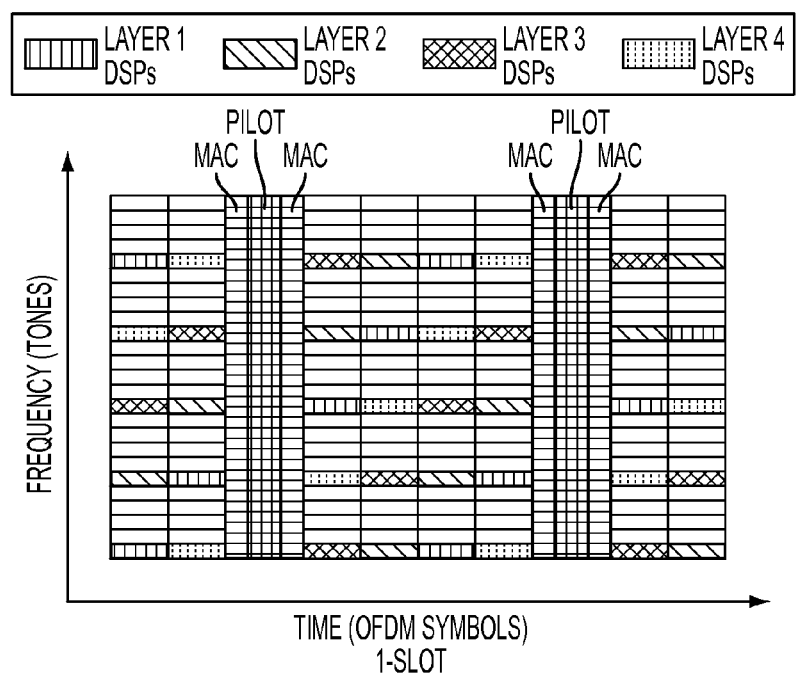

FIG. 6 is an illustration of an exemplary system 600, adapted according to embodiments for generating CSPs. FIG. 6 shows a higher level of detail for some of the functional units of the antenna demultiplexer 313, IFFT module 314, precoder module 315, and OFDM modulation modules 316 of FIG. 3. The system 600 is aware of the number of CSP pilots per antenna ($N_{csp}$), the corresponding locations of tones and the power spectral density (PSD) on CSPs, denoted by $PSD_{csp}$, and uses such information to form the CSP OFDM symbol. The CSP tones are populated by the modules 601, and the rest of the tones are zeroed out. The tones pass to IFFT modules 602, where IFFT operations are performed. Then, the modules 603 add a cyclic prefix and perform windowing operations. The final samples are added, for each antenna element, to the transmitted traffic data (if any). The $PSD_{csp}$ is a parameter with a nominal value of 1% of the total power for each antenna element in this example embodiment but may differ in other embodiments. The CSP tone allocation is affected by the DSP pattern, as described in more detail below.

The DSPs play two major roles in this embodiment. First, they are used for preamble detection, and second, they are used for OFDM data demodulation. DSPs are beamformed on the same beams used by traffic. For rank M transmission, the DSP tones are divided into $M \leq N_{layers,max}$ subsets, where each subset has $N_{DSP}$ tones. Table 2 shows numbers of DSP tones for different values of M, though other embodiments may differ.

TABLE 2

| | | FFT Size (NFFT) | |
|---|---|---|---|
| M | S | 180 | 192 |
| 1 | 2 | 15 | 16 |
| 2 | 2 | 15 | 16 |
| 3 | 3 | 10 | 16 for DRC 0, ..., 13 |
| | | | 8 for DRC 14, 15 |
| 4 | 4 | 9 for DRC 0, 1, ..., 13 | 12 for DRC 0, 1, ..., 11 |
| | | 3 for DRC 14, 15 | 6 for DRC 12, 13 |
| | | | 3 for DRC 14, 15 |

The DSP tones are equally spaced in the OFDM symbol for better channel estimation. The locations of DSP tones are pseudorandom across sectors, so that in general DSPs overlap with data, which may help in randomizing interference if traffic to pilot power ratio (T/P) is not equal to one. The following example process allocates DSP tones (though other embodiments may use different allocation methods):

Define DSP(m, n, k) is the subcarrier index of the kth Dedicated Spatial Pilot subcarrier in OFDM symbol n in the slot on virtual antenna m, where k=0, ..., $N_{DSP}-1$, n=0, ..., 7, and m=0, ..., M−1.

M is the number of virtual antennas for this Forward MIMO-OFDM Traffic Channel transmission.

S is the level of staggering for the rank.

DSP(0, 0, 0)=$f_{PHY\_HASH}$(x) mod $N_{FFT}$, where x=p×2$^{10}$+s, where p is PilotPN of the sector, and s is CDMA system time in slot modulo 1024.

Define q=$N_{FFT}/N_{DSP}$, which is the spacing between DSP subcarriers on the same virtual antenna in the unit of subcarriers; then DSP(0, 0, k)=(DSP(0, 0, 0)+q×k)mod $N_{FFT}$.

DSP(0,n+1,k)=DSP(0,n,k)+q/S mod $N_{FFT}$ for all n=0, ..., 6 and k=0, ..., $N_{DSP}$−1.

DSP(m+1,n,k)=DSP(m,n,k)+q/M mod $N_{FFT}$ for all n=0, ..., 7, k=0, ..., $N_{DSP}$−1, and m=0, ..., M−2.

The following properties are true for the above-described allocation algorithm:

For $N_{FFT}$=180, given the parameters designed, all DSP tones are on subcarriers with indexes satisfy 6k+f or 5k+f, where f=$f_{PHY\_HASH}$(x) mod $N_{FFT}$).

For $N_{FFT}$=192, given the parameters designed, all DSP tones are on subcarriers with indexes satisfy 6k+f or 4k+f, where f=$f_{PHY\_HASH}$(x) mod $N_{FFT}$).

$f_{PHY\_HASH}$(x) is a function that uses a seed x to generate an random-like integer number.

Applying the rules above, the DSP patterns for different values of M are shown for a particular embodiment in FIGS. 7A-D.

The CSP tone allocation is chosen to avoid the overlap between DSP and CSP on a CSP-slot. In one example with four physical antennas, the CSPs on antenna one and antenna two appear in OFDM symbols 1, 3, 5, an 7 only, and the CSPs on antenna two appears in OFDM symbols 2, 4, 6, 8 only. In this way, the number of CSP tones are the same in each OFDM symbol and CSP/DSP collision from the same sector can be avoided. An allocation technique for CSPs is given below, though other embodiments may use different CSP allocation techniques.

Define CSP(m, n, k) to be the subcarrier index of the kth CSP subcarrier in OFDM symbol n in the slot on physical antenna m, where k=0, ..., $N_{CSP}$, m, n−1, n=0, ..., 7, and m=0, ..., M−1.

$N_{CSP}$, m, n is the number of CSP subcarriers from physical antenna m on OFDM symbol n.

M is the number of physical antennas in the access network.

CSP(0,0,0)=($f_{PHY\_HASH}$(x)+1) mod $N_{FFT}$, where x=p× 210+s, where p is PilotPN of the sector, and s is the CDMA system time in slot modulo 1024.

Define q=$N_{FFT}/N_{CSP}$, 0, 0, which is the spacing between CSP subcarriers on the same physical antenna in the unit of subcarriers. Then:

CSP(0,0,k)=(CSP(0,0,0)+q×k)mod $N_{FFT}$

CSP(0,1,k)=(CSP(0,0,k)+q/2)mod $N_{FFT}$, and

CSP(1,0,k)=(CSP(0,0,k)+q/2)mod $N_{FFT}$, for k=0, ..., $N_{CSP}$, 0, 0−1.

When there are two physical antennas, CSP(m, n+2, k)=CSP(m, n, k) for all n=0, 1, ..., 5, m=0, 1, and k=0, ..., $N_{CSP}$, 0, 0−1.

When there are four physical antennas, CSP(m, n+4, k)=CSP(m, n, k) for all n=0, 1, m=0, 1, and k=0, ..., NCSP, 0, 0−1; and CSP(m+2, n+2, k)=CSP(m, n, k) for all n=0, 1, 4, 5, m=0, 1, and k=0, ..., NCSP, 0, 0−1.

The following properties are true for the above-described allocation algorithm:

For $N_{FFT}$=180, given the parameters designed, all CSP tones are on subcarriers with indexes satisfying 10k+f+1, where f is the same as for the DSP tone allocation in the same slot.

For $N_{FFT}$=192, given the parameters designed, all CSP tones are on subcarriers with indexes satisfying 12k+f+1, where f is the same as for the DSP tone allocation in the same slot. Therefore, collisions with DSP tones in the same slots are eliminated.

In short, both the DSP and CSP allocation techniques given above start from the same number, f, where f is a random number as a function of PNOffset and time. DSP location selection starts from subcarrier f. CSP location selection starts from subcarrier f+1. The number of DSP/CSP tones per OFDM symbol is designed such that there is no collision.

The transmitted modulation symbols on DSPs are scrambled with a pseudo-random sequence that is a function of the sector ID, the slot index and the sub-packet index. In this particular embodiment, there is a dependency on the layer index (n) to randomize the different MIMO data sub-streams. In addition, since the DSP is used for preamble detection, the DSP sequence is also a function of the served user preamble information. The preamble information, as described below, includes eight bits of MAC-ID and sometimes two extra bits, depending on the DRC information received from the remote device.

Figure 8:
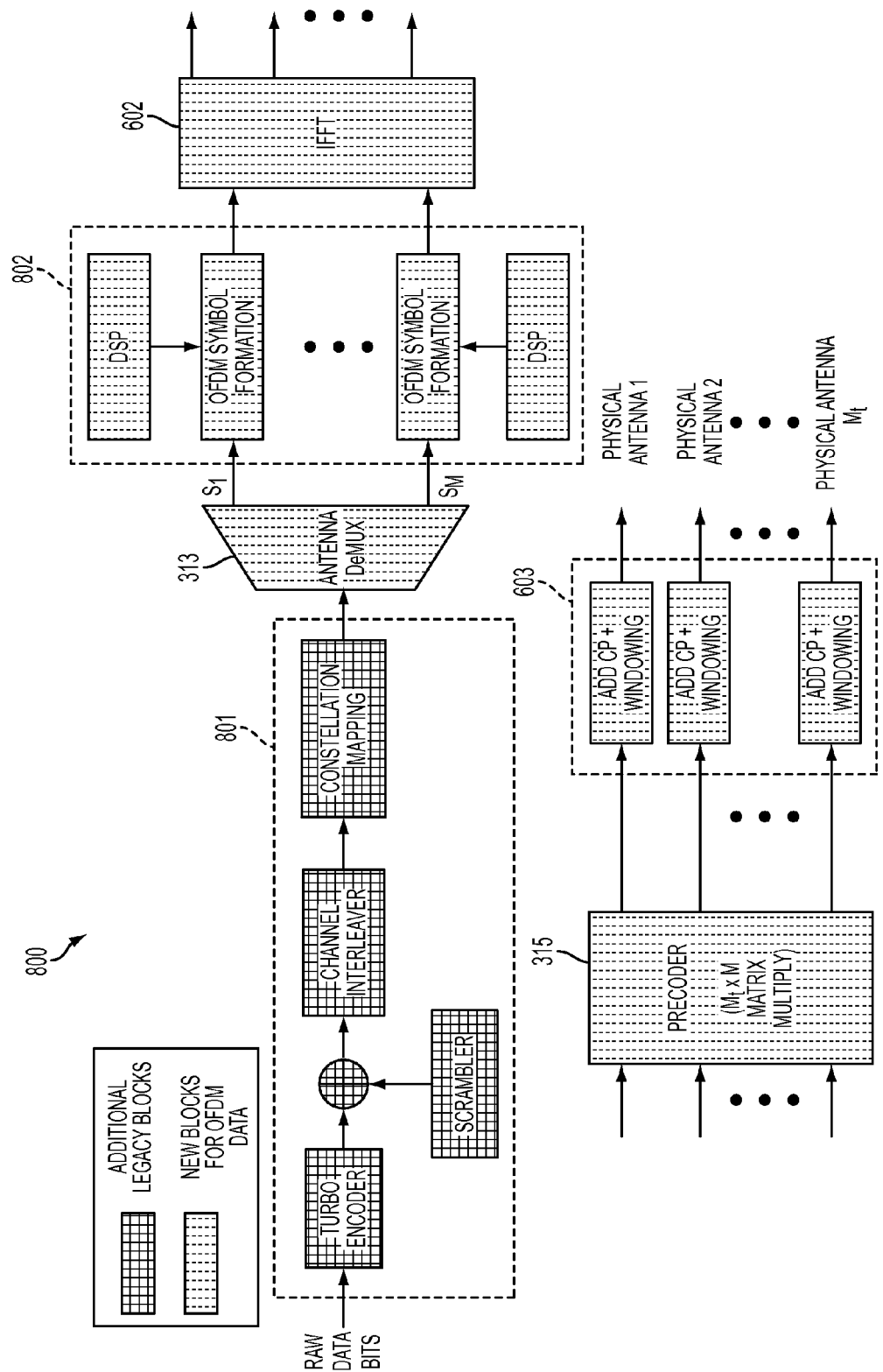
FIG. 8 is an illustration of an exemplary system, adapted according to one embodiment.

As mentioned above, the example embodiment uses precoded SCW MIMO. FIG. 8 is an illustration of an exemplary system 800, adapted according to one embodiment and using precoded SCW MIMO. FIG. 8 shows the subject matter of FIG. 3 in a different level of detail. As shown in FIG. 8, the raw data bits are encoded, channel interleaved and mapped to constellation points by the module 801. The data is then divided into M sub-streams by the demultiplexer 313, where M is the rank fed back from the remote unit. The modulation symbols of each data stream and the DSPs are mapped to their corresponding tones by the module 802 and then converted to the time domain by IFFT module 602. Before adding the cyclic prefix and windowing operations, the M data sub-streams are precoded by the module 315 using the M×$M_t$ matrix corresponding to the PMI fed back by the remote unit. In some embodiments, the precoding operation can be performed before the IFFT operation is performed. The PMI is an entry in a pre-defined codebook that is the closest to the correct Eigen matrix of the channel realization, i.e., the entry that increases or maximizes the throughput to the remote unit.

To decouple the MIMO data sub-streams, the remote unit can employ a linear or non-linear detection scheme. The MIMO detector of the remote unit outputs the soft estimates of the data symbols on different sub-streams to the turbo decoder.

The present embodiment adopts a default random codebook that is discrete Fourier transform (DFT)-based. The codebook size is eight (three bits feedback) and sixteen (four bits feedback) for $M_t=2$ and $M_t=4$, respectively. A non-default codebook can be also signalled to the remote unit for some embodiments.

The following description illustrates how to generate the default codebook for $M_t=4$. A similar procedure can be used for the case of $M_t=2$. Let the variable t be the PMI (i.e., t=1 ... 16).

The $i^{th}$ PMI matrix is given by Equations 1, 2, and 3, where D is the 4-by-4 DFT matrix.

$$\varphi_{k,i} = 2\pi \frac{([\text{BIT\_RESERVE}\{((4i+k) \times 2654435761)\mod 2^{32}\}]\mod 2^{2o})}{(2^{2o})}, \quad \text{EQUATION 1}$$
$$k = 0, 1, 2, 3$$

$$U_i = \begin{bmatrix} e^{j\varphi_{i,0}} & 0 & 0 & 0 \\ 0 & e^{j\varphi_{i,1}} & 0 & 0 \\ 0 & 0 & e^{j\varphi_{i,2}} & 0 \\ 0 & 0 & 0 & e^{j\varphi_{i,3}} \end{bmatrix} D \qquad \text{EQUATION 2}$$

$$D = \{D_{m,n}m, n = 0, \ldots, 3\}, D_{m,n} = \frac{1}{\sqrt{4}} e^{j\frac{2\pi mn}{4}} \qquad \text{EQUATION 3}$$

In the case when M<Mt, the first M columns of the precoding matrix are used for transmission.

Figure 9:
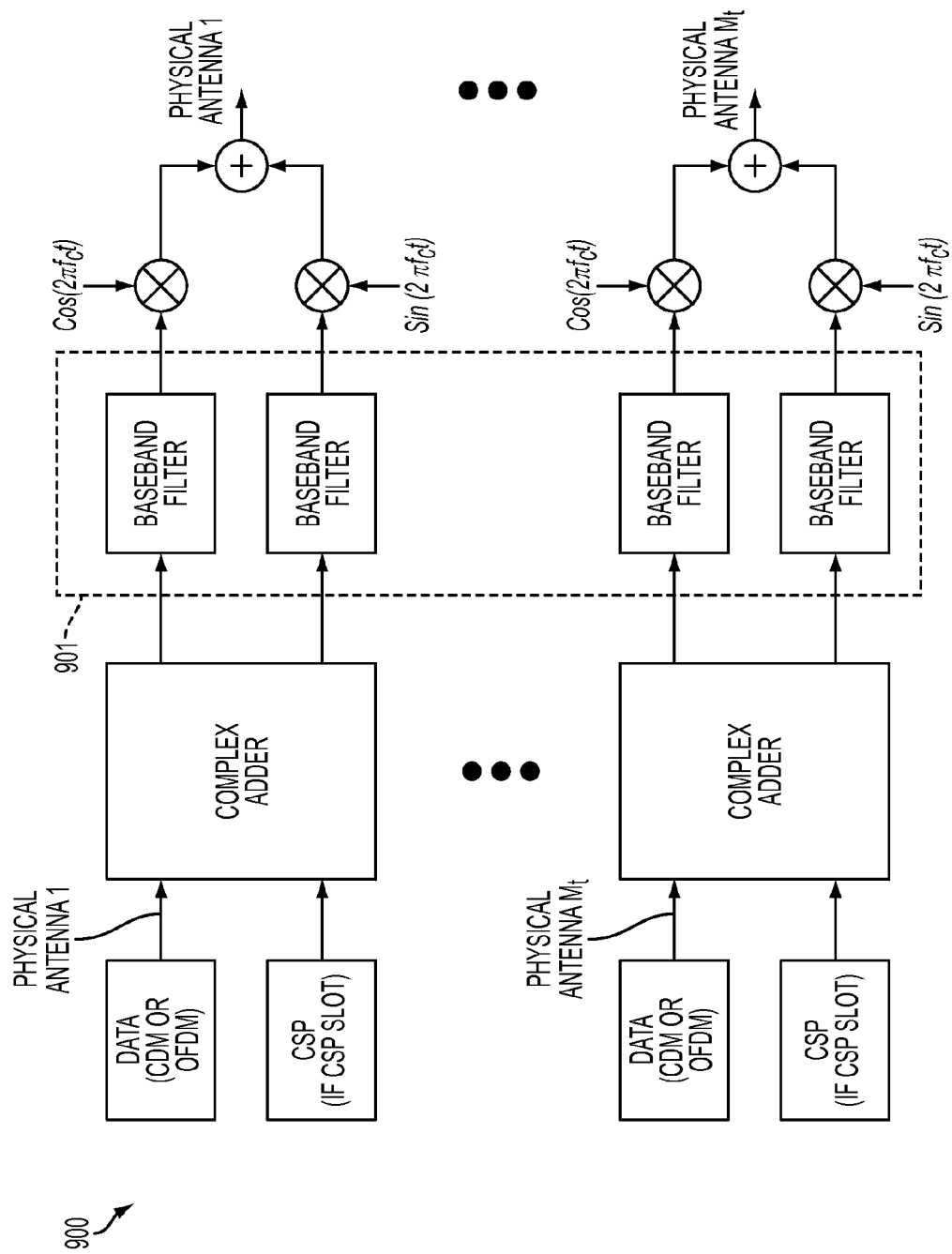
FIG. 9 is an illustration of an exemplary system for combining the CSPs with the data, according to one embodiment.

FIG. 9 is an illustration of exemplary system 900 for combining the CSPs with the data, according to one embodiment. FIG. 9 shows some of the circuitry of base station 301 of FIG. 3 in a different level of detail. The CSP waveform and the data/DSP waveform are combined in the time domain before the baseband filter module 901 either at or after OFDM modulator modules 316 (of FIG. 3).

For OFDM slots, the preamble is signalled on the DSPs in this embodiment. The preamble information includes eight bits of MAC identification and sometimes two extra bits, depending on the DRC feedback from the remote unit. The DRCs are defined for every rank M, and this example embodiment supports sixteen DRCs per rank.

The number of bits signalled on the preamble depends on a (DRC,M) threshold, $Th_{DRC}$. When the signalled (DRC,M) is below $Th_{DRC}$, only the 8-bit MAC-ID is signalled. In this case, the remote unit resorts to multiple hypotheses decoding to discern the actual transmitted packet format among the canonical and non-canonical formats (similar to the EVDO Rev. A/B current air interface). On the other hand, when the signalled (DRC,M) is above $Th_{DRC}$, the preamble signals two extra bits identifying one of the four potential packet formats for the DRC feedback. The purpose is to ease the decoding burden on the remote unit whenever the requested data rate is reasonably high.

The preamble detection can be improved on some DRCs by increasing the DSP-to-traffic power ratio or by using extra DSPs on the first layer and first sub-packet (i.e. whenever the preamble is sent). When M>1, all DSPs can potentially be used in preamble detection.

Various embodiments include a set of packet formats for different numbers of MIMO layers, where each packet format is uniquely identified by the rank and the DRC. Such packet formats are designed in a way to fully utilize EVDO Rev A/B interleavers and decoders, thereby facilitating backward compatibility. Large packet sizes are decomposed into multiple packet components (PC) where each PC conforms to a current EVDO Rev. A/B packet format.

For instance, for DRC 10 and rank 1, there are two PCs each of 5120 bits, denoted respectively by A and B in this example. The transmission scheme in any slot is to fully transmit the modulation symbols for PC A and then transmit those of PC B. Such a technique may ease decoding implementation and reduce the pipeline delay as PC A does not have to wait for the end of the slot to be decoded. Additionally or alternatively, it is possible to mix modulation symbols from PC A and PC B for the purpose of exploiting some time diversity at the expense of implementation complexity.

Returning to FIG. 3, three main channels are fed back by the remote unit 302 to the base station 301 to support MIMO-OFDM in the forward link. Such channels are the DRC (four bits) 350, the spatial rank channel (SRC) 340 carrying the transmission rank (one and two bits for $M_{layers,max}=2$ and 4 respectively), and the spatial signature channel (SSC) 330 carrying the PMI (three and four bits for $M_{layers,max}=2$ and 4, respectively). In this embodiment, the total number of bits supporting MIMO in the three channels 330, 340, 350 is eight and ten bits for $N_{layers,max}=2$ and 4, respectively.

As shown above in FIG. 3, the remote unit 302 feeds back information to the base station 301. While DRC is used in legacy EVDO Rev. A/B, various embodiments of the invention add other feedback, such as the spatial rank channel and a spatial signature channel to carry the PMI. The feedback over the reverse links supports the forward link.

Figure 10:
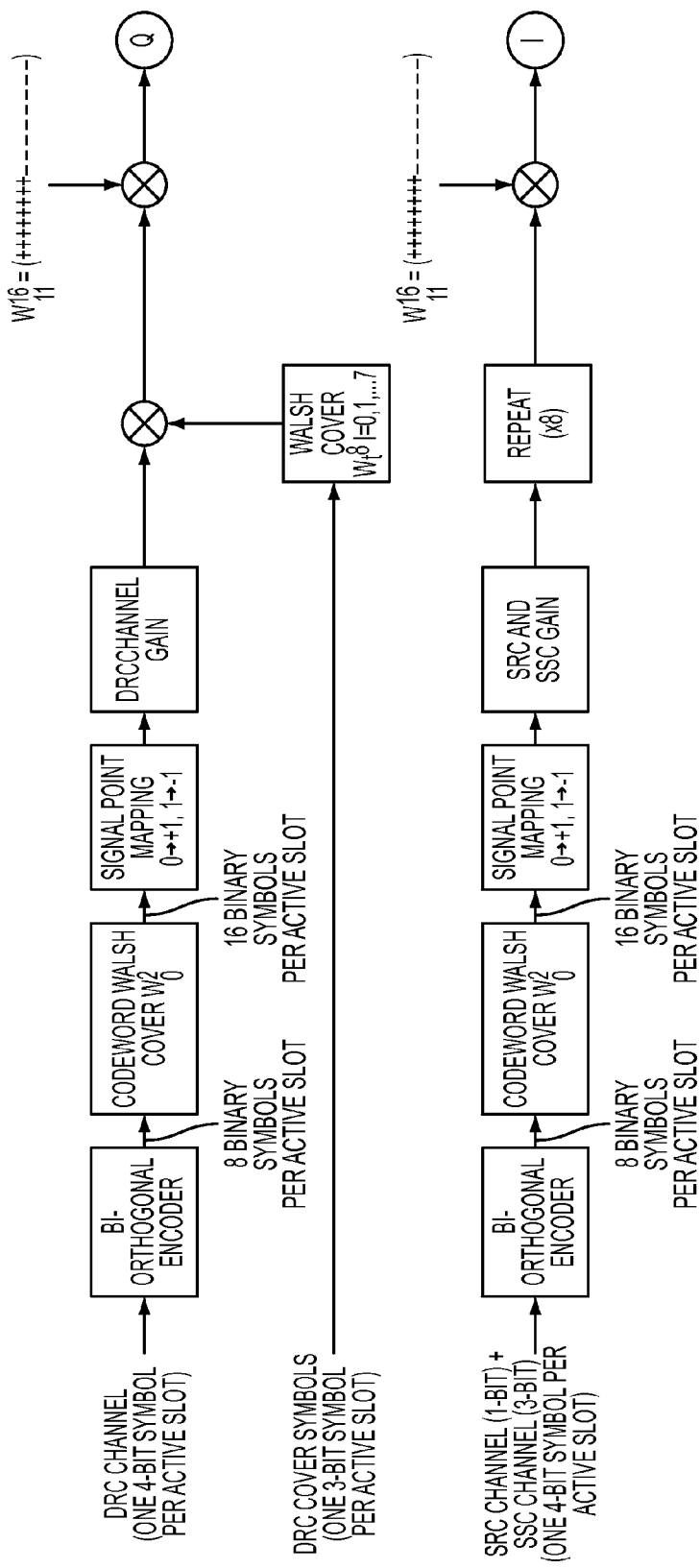
FIGS. 10 and 11 illustrate modules of the remote unit of FIG. 3 according to one embodiment.
Figure 11:
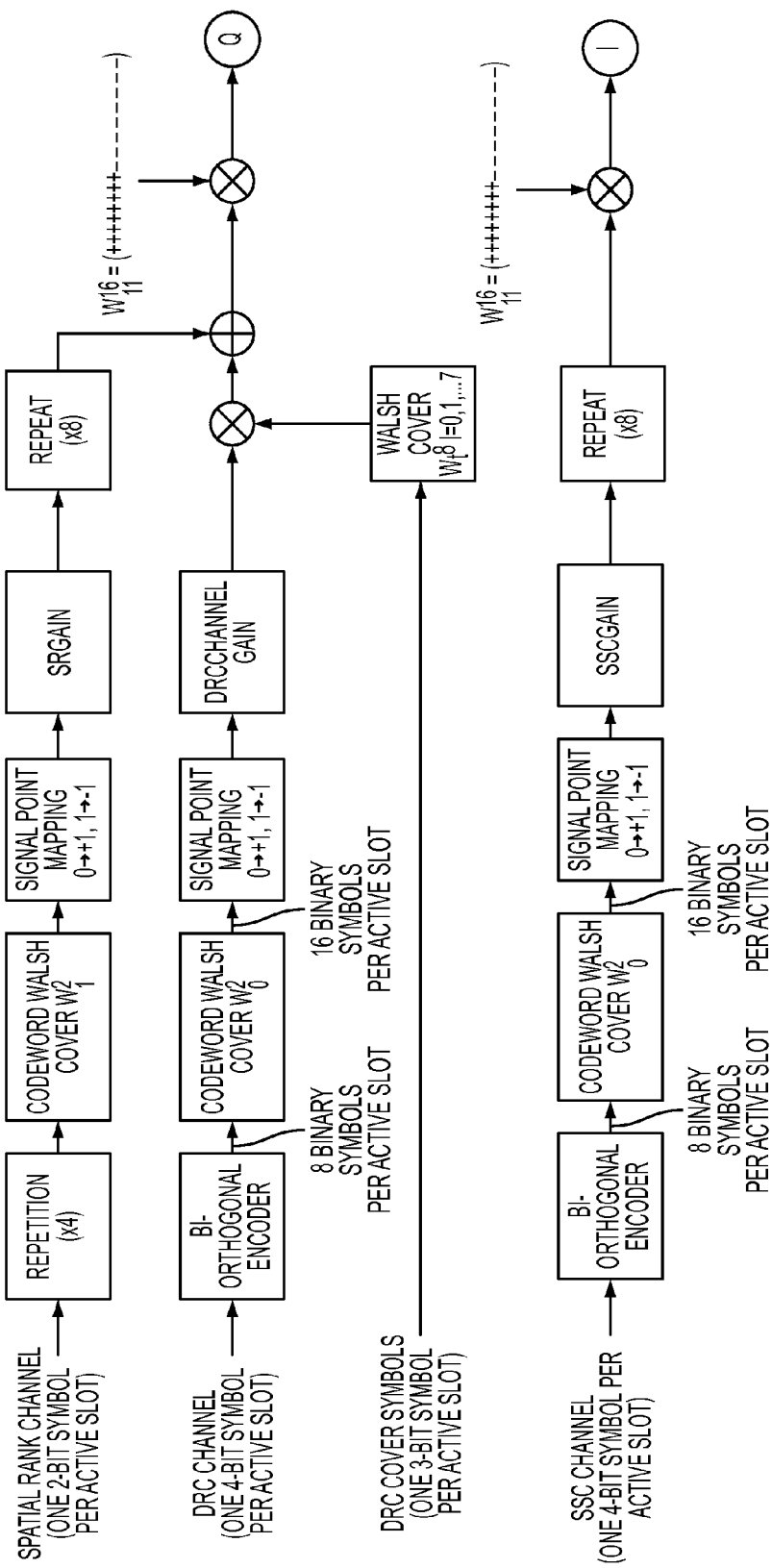

In this EVDO example, EVDO Rev. B enhanced feedback multiplexing is used in the reverse link feedback to support the forward link in some instances, even if the reverse link feedback uses only a single carrier. In addition to (or instead of) Rev. B enhanced feedback multiplexing, embodiments can also use different Long Code Masks (LCMs) to designate the additional channels, even if only a single RL carrier is available. As explained below, such techniques can provide backward compatibility with Rev. A/B embodiments. The feedback mechanism of this example reuses the EVDO Rev. B enhanced feedback multiplexing design with different interpretations for the transmitted bits, as shown in FIGS. 10 and 11 for $M_t=2$ and $M_t=4$, respectively. FIGS. 10 and 11 illustrate modules of the remote unit 302 of FIG. 3 in a different level of detail. In order to distinguish the MIMO feedback of the present embodiment from the legacy feedback in EVDO Rev. A and B and/or to support MIMO with multi-carrier capabilities, different Long Code Masks (LCM) are used. Thus, at the outputs of FIGS. 10 and 11, the feedback is scrambled with an LCM that is different than that used with legacy transmissions or other transmissions on a different carrier. Therefore, the feedback in this example is compatible with systems that use EVDO B.

Examples are given below for partial upgrade scenarios, where one aspect uses EVDO Rev. A/B, and one aspect uses a MIMO embodiment. In networks with partial upgrades, base stations can use MIMO-OFDM on some sector carriers and EVDO Rev. A/B on other sector carriers when both sector carriers are in the active set. Different LCMs are used to differentiate between MIMO and legacy Rev. A/B aspects.

In one example, the remote unit has only one access point (AP) in the active set that deploys two carriers. A first one of the carriers uses a MIMO embodiment as described above, and a second carrier uses EVDO Rev. A/B. In this example, a first LCM is used for the first carrier and a second LCM is used for the second carrier.

Figure 12:
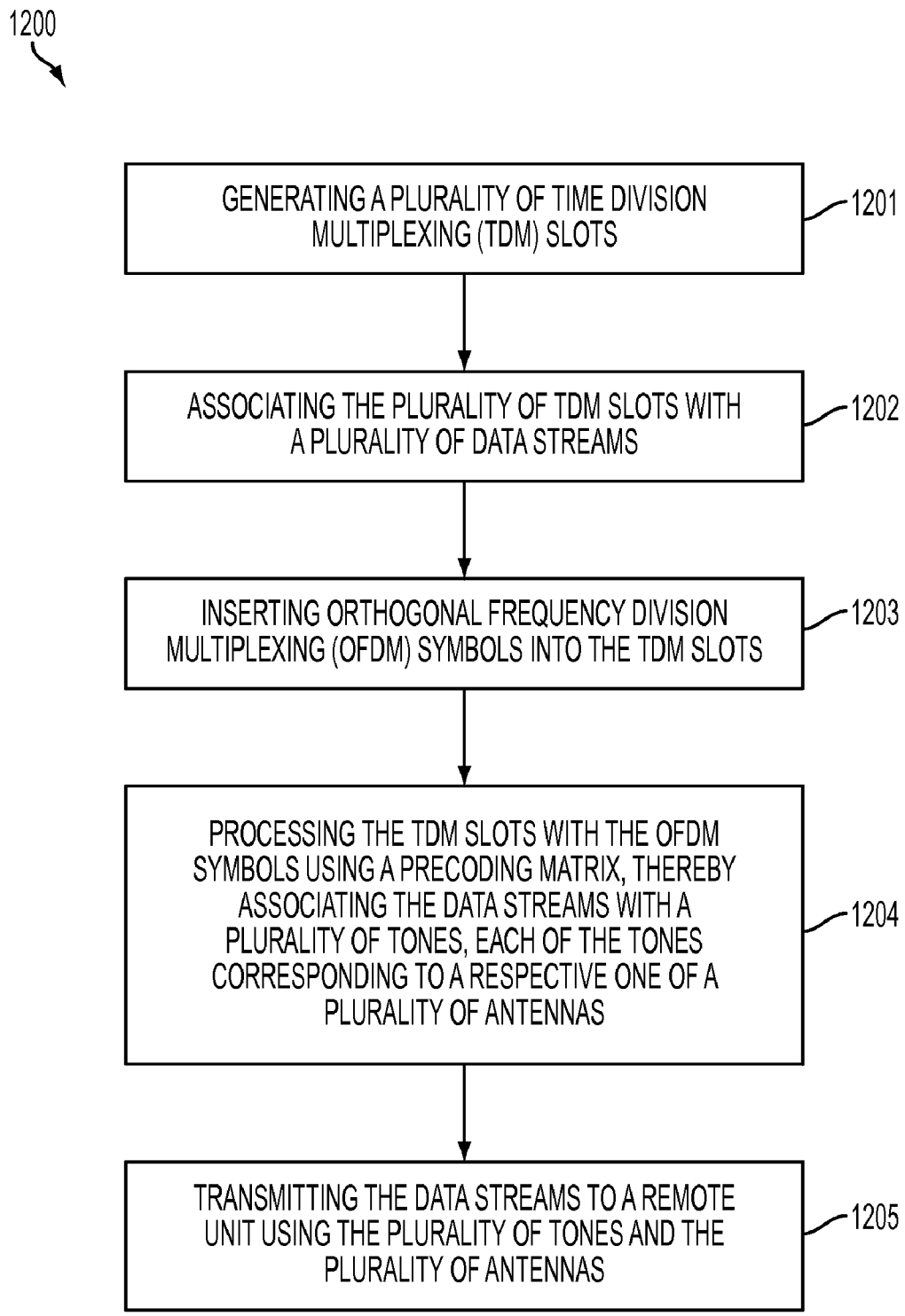
FIG. 12 is an illustration of an exemplary process according to one embodiment.

In another example, the remote unit active set has two sectors, $AP_1$ and $AP_2$. $AP_1$ has two carriers and operates according to a MIMO embodiment described above, while $AP_2$ has four carriers and operates according to EVDO Rev. A/B. In this example, $LCM_1$ and $LCM_2$ are used for the carriers of $AP_1$. In addition $LCM_3$ can be used for EVDO Rev. A/B support using enhanced feedback multiplexing. As shown above, different LCMs are applied to MIMO carrier and legacy Rev. A/B carrier. Further, a different LCM is used for each MIMO carrier. Various embodiments of the invention include processes performed by the systems shown above. FIG. 12 is an illustration of exemplary process 1200, adapted according to one embodiment of the invention. The exemplary process 1200 may be performed, for example, by the base station shown in FIGS. 3 and 8.

In block 1201, multiple TDM slots are generated. In block 1202, the plurality of TDM slots are associated with multiple data sub-streams by, e.g., multiplexing the data sub-streams onto a group of virtual antennas.

In block 1203, OFDM symbols are inserted into the TDM slots. Block 1203 may also include inserting DSPs into the slots as well.

In block 1204, the TDM slots with the OFDM symbols are processed using a precoding matrix, thereby associating the data sub-streams with multiple tones, each of the tones corresponding to a respective one of the antennas. In this example, the precoding matrix includes beamforming vectors or spatial multiplexing vectors that define how the data sub-streams are transmitted. The number of physical antennas may be different than the number of virtual antennas. In block 1205, the data sub-streams are transmitted to a remote unit using the tones and the antennas. Block 1205 may also include inserting CSPs.

Figure 13:
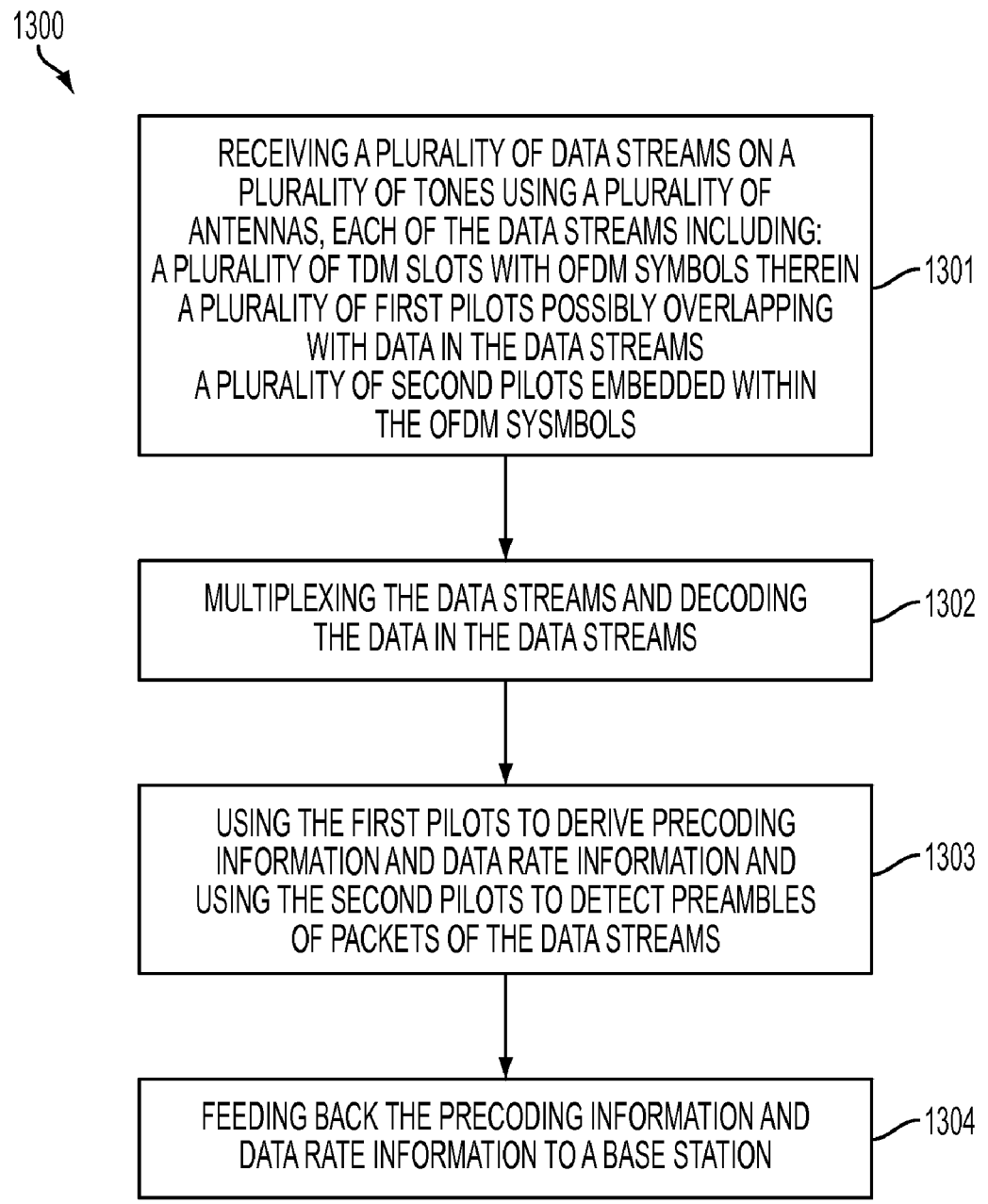
FIG. 13 is an illustration of an exemplary process according to one embodiment.

While the process 1200 is shown as a series of discrete steps, the scope of embodiments is not so limited. Various embodiments may add, omit, rearrange, or modify one or more of the steps. For instance, some embodiments continually repeat the process 1200 many times in the course of communicating with a remote unit. FIG. 13 is an illustration of exemplary process 1300, adapted according to one embodiment of the invention. The exemplary process 1300 may be performed, for example, by the remote unit shown in FIG. 3.

In block 1301, multiple data sub-streams are received on multiple tones using multiple antennas. Each of the data sub-streams includes multiple TDM slots with OFDM symbols therein, first pilots possibly overlapping with data in the data sub-streams, and second pilots embedded within the OFDM symbols. In block 1302, the data sub-streams are multiplexed and the data in the data sub-streams is decoded.

In block 1303, the first pilots are used to derive precoding information and data rate information, and the second pilots are used to detect preambles of packets of the data sub-streams. In block 1304, the precoding information and data rate information are fed back to the base station.

While the process 1300 is shown as a series of discrete steps, the scope of embodiments is not so limited. Various embodiments may add, omit, rearrange, or modify one or more of the steps. For instance, some embodiments continually repeat the process 1300 many times in the course of communicating with a base station.

In addition to the processes 1200 and 1300 above, various embodiments can transmit a legacy EVDO Rev. A/B signal over a base station with multiple antennas. In some embodiments, a base station equipped for MIMO will have one power amplifier for each antenna, whereas a legacy base station (equipped for only a single antenna) will include one power amplifier. Many MIMO-equipped base stations will have power amplifiers that are each less powerful than the single power amplifier of the single-antenna base station. Therefore, it may not be desirable to simply map a legacy EVDO Rev. A/B signal to a single antenna of a MIMO-equipped base station.

Some embodiments, therefore, assign legacy EVDO Rev. A/B signals to a single virtual antenna (data sub-stream) that is mapped to the physical antennas using one or more beamforming vectors. In one specific example, the single virtual antenna is mapped to each of the physical antennas, and a slow phase sweep of the physical antennas is included to compensate for nulls.

Embodiments of the invention may provide one or more advantages. As shown above, various embodiments include a forward link MIMO OFDM design that is backward-compatible with EVDO Rev. A/B. In fact, some embodiments are not only backward-compatible with EVDO Rev. A/B, but also attain a data rate of 18.7 Mbps in 1.25 MHz forward links. MIMO systems are known to asymptotically (SNR→∞) provide a linear increase in capacity utilizing the spatial dimension through transmitting multiple modulation symbols simultaneously. Such mode of MIMO is often referred to as spatial multiplexing (SM) and is supported by various embodiments. Another mode of operation for MIMO is to exploit transmit diversity (TD), improving the quality of the communication link, and such mode is supported by various embodiments as well. In addition, with channel feedback available from the remote unit, the base station can transmit along the Eigen dimensions of the matrix of steering vectors; a mode often referred to as beamforming.

Various embodiments employ different MIMO modes depending on the channel conditions. For instance in scenarios where the Signal to Noise Ratio (SNR) is high, SM and beamforming (if available) typically present the right choice. For low SNR scenarios, TD and beamforming (if available) typically present the right choice. One setup for high SINR scenarios is furnished through heterogeneous deployments where low-cost and small-sized base stations are used, e.g., either in hot spots when Pico cells are installed or at homes when Femto cells provide the coverage. Typically such deployments enjoy high SINR that can be exploited by MIMO embodiments described above.

In macro deployments, the different modes of MIMO can be used to improve the sector throughput. For those users enjoying high SINR, SM allows for higher data rates (i.e. improves the peak rates). Such scenario is particularly important in partial loading cases when a load of an adjacent sector is not maximized. Beamforming and TD, on the other hand, are usually used to improve link quality and coverage for low SINR users.

In various embodiments, OFDM transmission is supported in a similar fashion as in Platinum Broadcast (PB) where the TDM nature of forward link EVDO is utilized. The MIMO design of the examples above is a closed-loop design, using feedback from the remote unit to select precoding matrices and exploit Eigen beamforming gains.

Additionally, while the examples above describe using OFDM for data chips in the forward link, the embodiments are not so limited. For example, various embodiments can use OFDM for some data chips and use other techniques, such as CDMA, for other data chips. In fact, various embodiments can switch between OFDM and CDMA for use in the data chips. The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors, digital signal processing devices (DSPDs), programmable logic devices (PLDs), field programmable gate arrays (FPGAs), processors, controllers, microcontrollers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine or computer readable medium tangibly embodying instructions may be used in implementing the methodologies described herein. For example, software code may be stored in a memory and executed by a processor. When executed by the processor, the executing software code generates the operational environment that implements the various methodologies and functionalities of the different aspects of the teachings presented herein. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

The machine or computer readable medium that stores the software code defining the methodologies and functions described herein includes physical computer storage media. A storage medium may be any available medium that can be accessed by the processor. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. As used herein, disk and/or disc includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media. The devices of FIG. 1 can implement hardware, firmware, and/or software implementations as described above and can also implement the tangible storage media integrated with, or separate from, the respective processors.

Although the present disclosure and its advantages have been described in detail, it should be understood that various changes, substitutions and alterations can be made herein without departing from the technology of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A system for supporting forward link multi input multi output (MIMO) communications, comprising:
   a plurality of antennas;
   a Time Division Multiplexing (TDM) module configured to generate a plurality of TDM slots from a received data stream;
   demultiplexing circuitry configured to insert within the plurality of TDM slots a plurality of Orthogonal Frequency Division Multiplexing (OFDM) symbols and associating the TDM slots with a plurality of data sub-streams; and
   precoding circuitry configured to associate the plurality of data sub-streams with a plurality of tones, wherein each of the respective tones corresponds to a respective one of the antennas, the plurality of antennas transmitting the plurality of data sub-streams using the plurality of tones.

2. The system of claim 1 further comprising:
   circuitry associated with each of the plurality of antennas and configured to insert a first set of pilots within transmissions associated with each of the antennas.

3. The system of claim 2 wherein the first set of pilots comprises:
   the first set of pilots transmitted on each of the respective antennas every N slots, where N is an integer larger than one, the first set of pilots overlapping with data in the transmissions.

4. The system of claim 1, wherein the demultiplexing circuitry embeds a second set of pilots within the OFDM symbols.

5. The system of claim 4 wherein the second set of pilots are staggered across the plurality of OFDM symbols in a substantially random pattern across sectors.

6. The system of claim 1, wherein the precoding circuitry receives a first signal from a remote device and uses the first signal to select and apply a beamforming matrix to the plurality of data sub-streams.

7. The system of claim 1, wherein each data sub-stream comprises a plurality of packets, each data sub-stream sharing a common preamble.

8. The system of claim 7 wherein at least some of the preambles include Media Access Control (MAC) identification information and Data Rate Channel (DRC) information.

9. The system of claim 7 wherein the demultiplexing circuitry embeds a second set of pilots within the OFDM symbols, and wherein the preambles are transmitted by scrambling sequences of the second set of pilots.

10. The system of claim 1 further comprising a receiver configured to receive reverse link feedback, including indications of precoding operations, for Evolution Data Optimized (EVDO) Rev. B and Multiple Input Multiple Output (MIMO) transmissions, wherein MIMO reverse link feedback and EVDO Rev. B reverse link feedback are assigned different long code masks.

11. The system of claim 1, wherein the demultiplexing circuitry assigns an EVDO Rev. A/B signal to a single data sub-stream, and the precoding circuitry maps the single data sub-stream to the plurality of antennas and applies a varying phase shift to the plurality of antennas while transmitting the EVDO Rev. A/B signal over the plurality of antennas.

12. A method for supporting forward link multi input multi output (MIMO) communications, comprising:
    generating a plurality of Time Division Multiplexing (TDM) slots from a received data stream;
    associating the plurality of TDM slots with a plurality of data sub-streams;
    inserting Orthogonal Frequency Division Multiplexing (OFDM) symbols into the TDM slots;
    processing the TDM slots with the OFDM symbols using a precoding matrix, thereby associating the data sub-streams with a plurality of tones, each of the tones corresponding to a respective one of a plurality of antennas; and
    transmitting the data sub-streams to a remote unit using the plurality of tones and the plurality of antennas.

13. The method of claim 12 wherein the data sub-streams comprise virtual antennas.

14. The method of claim 12 further comprising inserting a set of dedicated spatial pilots to reduce overlap with common spatial pilots.

15. The method of claim 12 further comprising:
    inserting a set of dedicated spatial pilots into the OFDM symbols.

16. The method of claim 15 further comprising:
    inserting a set of common spatial pilots staggered across the plurality of OFDM symbols in a substantially random pattern across sectors.

17. A system for supporting forward link multi input multi output (MIMO) communications, comprising:
    a plurality of antennas;
    means for creating a plurality of TDM slots from a received data stream;
    means for inserting within the plurality of TDM slots a plurality of Orthogonal Frequency Division Multiplexing (OFDM) symbols and associating the TDM slots with a plurality of data sub-streams; and
    means for associating the plurality of data sub-streams with a plurality of tones, wherein each of the respective tones corresponds to a respective one of the antennas, the plurality of antennas transmitting the plurality of data sub-streams using the plurality of tones.

18. The system of claim 17 wherein the number of data sub-streams is different than the number of antennas.

19. The system of claim 17 wherein the TDM slots include Evolution Data Optimized (EVDO) pilots.

20. The system of claim 17 employed in an EVDO network.

21. The system of claim 17 further comprising:
    means for inserting a first set of pilots in the OFDM symbols; and
    means for inserting a second set of pilots at the plurality of antennas.

22. A computer program product for supporting forward link multi input multi output (MIMO) communications, tangibly embodying a computer readable medium having computer program logic recorded thereon, the computer program product comprising:
    code that generates a plurality of Time Division Multiplexing (TDM) slots from a received data stream;
    code that associates the plurality of TDM slots with a plurality of data sub-streams;
    code that inserts Orthogonal Frequency Division Multiplexing (OFDM) symbols into the TDM slots; and
    code that processes the TDM slots with the OFDM symbols using a precoding matrix, thereby associating the data sub-streams with a plurality of tones, each of the tones corresponding to a respective one of a plurality of antennas.

23. The computer program product of claim 22 further comprising:
    code that inserts common spatial pilots into transmissions at the plurality of antennas.

24. The computer program product of claim 23 further comprising:
    code that inserts dedicated spatial pilots.

25. The computer program product of claim 22 further comprising:
    code that selects the precoding matrix in response to feedback from a remote unit.

26. A system for supporting forward link multi input multi output (MIMO) communications comprising:
    a plurality of antennas defined within a mobile device and configured to receive a plurality of data sub-streams on a plurality of tones, each of the data sub-streams including:
        a plurality of Time Division Multiplexing (TDM) slots with Orthogonal Frequency Division Multiplexing (OFDM) symbols therein;
        a plurality of first pilots possibly overlapping with data in data transmissions; and
        a plurality of second pilots embedded within the OFDM symbols;
    circuitry configured:
        to multiplex the data sub-streams;
        to decode the data in the data sub-streams;
        to derive precoding information, spatial multiplexing order information, and data rate information using the first pilots;
        to detect preambles of packets of the data sub-streams using the second pilots;
        to demodulate and decode the data sub-streams; and
        to feed back the precoding information, spatial multiplexing order information, and data rate information to a base station.

27. The system of claim 26 wherein the data rate information comprises Data Rate Channel (DRC) information.

28. The system of claim 26 wherein the precoding information comprises:
    data indicating a beamforming matrix for use in transmitting a plurality of next data sub-streams.

29. The system of claim 26 transmitting the precoding information, spatial multiplexing order information, and data rate information in reverse link feedback, and operable to transmit the reverse link feedback over Evolution Data Optimized (EVDO) Rev. B and Multiple Input Multiple Output (MIMO) transmissions, wherein MIMO reverse link feedback and EVDO Rev. B reverse link feedback are assigned different long code masks.

* * * * *